United States Patent [19]
Schumann et al.

[11] Patent Number: 6,012,106
[45] Date of Patent: Jan. 4, 2000

[54] PREFETCH MANAGEMENT FOR DMA READ TRANSACTIONS DEPENDING UPON PAST HISTORY OF ACTUAL TRANSFER LENGTHS

[75] Inventors: Reinhard C. Schumann, Stow; Yong S. Oh, Belmont, both of Mass.

[73] Assignee: Digital Equipment Corporation, Maynard, Mass.

[21] Appl. No.: 08/962,631

[22] Filed: Nov. 3, 1997

[51] Int. Cl.[7] .............................. G06F 12/08; G06F 13/00
[52] U.S. Cl. .............................. 710/22; 710/26; 710/52; 709/2; 711/213; 711/221; 711/171
[58] Field of Search .................. 710/1, 22, 26, 710/52, 213, 221, 171; 709/2

[56] References Cited

U.S. PATENT DOCUMENTS

| | | | |
|---|---|---|---|
| 4,788,641 | 11/1988 | Ishiguro et al. | 364/200 |
| 5,448,719 | 9/1995 | Schultz et al. | 395/182.03 |
| 5,507,028 | 4/1996 | Liu | 395/375 |
| 5,581,714 | 12/1996 | Amini et al. | 395/308 |
| 5,581,718 | 12/1996 | Grochowski | 395/382 |
| 5,659,713 | 8/1997 | Goodwin et al. | 395/484 |
| 5,713,003 | 1/1998 | DeWitt et al. | 395/445 |
| 5,761,464 | 6/1998 | Hopkins | 395/310 |
| 5,796,971 | 8/1998 | Emberson | 395/383 |
| 5,822,749 | 10/1998 | Agarwal | 707/2 |

FOREIGN PATENT DOCUMENTS

| | | | |
|---|---|---|---|
| 0712082A1 | 5/1996 | European Pat. Off. | G06F 12/08 |

OTHER PUBLICATIONS

"DECchip 21071 and DECchip 21072 Core Logic Chipsets," Mar. 1995.

*Primary Examiner*—Thomas C. Lee
*Assistant Examiner*—Rehana Perveen
*Attorney, Agent, or Firm*—Hamilton, Brook, Smith & Reynolds, P.C.

[57] ABSTRACT

A memory controller for optimizing direct memory access (DMA) read transactions wherein a number of cache lines are prefetched from a main memory as specified in a prefetch length field stored in a page table. When all prefetch data has been fetched, the memory controller waits to determine whether the initiator of the DMA read transaction will request additional data. If additional data is needed, additional cache lines are fetched. Once the initiator terminates the DMA read transaction, the prefetch length field for a selected page other entry in the table is updated to reflect the actual DMA read transaction length. As a result, an optimum number of cache lines are always prefetched thereby reducing the number of wait states required.

10 Claims, 3 Drawing Sheets

PREFETCH MANAGEMENT FOR DMA READ TRANSACTIONS DEPENDING UPON PAST HISTORY OF ACTUAL TRANSFER LENGTHS

FIELD OF THE INVENTION

The present invention relates to data processing systems and in particular to managing data prefetch in memory read operations.

BACKGROUND OF THE INVENTION

The Peripheral Component Interconnect (PCI) bus is an input/output bus commonly used in contemporary computer systems. This bus provides a capability for so-called direct memory access (DMA) transactions which may be of variable length, using a variable number of bus cycles. The length of each PCI DMA transaction is not determined in advance, but rather the transaction continues for as long as a DMA transaction master continues to request additional data.

For DMA read operations, it is generally not efficient to fetch the data from memory separately for each bus cycle, since the access time of the memory is typically much longer than the duration of a bus cycle. Consequently, when a DMA read transaction is started, a block of data sufficient for several bus cycles is fetched from memory, and the data is then transferred over the bus in several cycles.

In certain prior art systems, a variety of memory prefetch schemes have been used, but these schemes have typically been designed to prefetch a specific amount of data. If the prefetch size is large, memory throughput may be wasted when the prefetch data is not all used. If the prefetch size is small, PCI bus throughput may be wasted when additional data is requested and bus wait states are inserted.

For example, one common DMA scheme is to provide for efficient read access to a predetermined number of bytes in the main memory. The access group size is typically selected to be consistent with the word size of a cache memory local to the CPU, known as a cache line. For example, a cache line may consist of 64 bytes of memory. Such DMA read techniques assume that read accesses will occur sequentially to a contiguous block of multiple cache lines in the memory. With this assumption, on each DMA read transaction, an amount of data equal to the cache line size is automatically prefetched from the memory whether or not all of it is needed on the next transaction. Additional cache lines may also be prefetched, before it is even known whether the first cache line will be fully consumed.

If the prefetched data is actually needed to complete the transaction, the end result is that the overall waiting time is reduced. In other words, the result is that the requested cache lines are completely read from the memory before the I/O device even requests them. However, if not all the data is not needed, then memory throughput will have been wasted in proportion to the amount of unused data. If the central processing unit was waiting for memory access during this time, the wasted throughput causes a corresponding reduction in CPU performance.

This problem is exacerbated in a computer design where the system provides for cache coherency on DMA read operations by accessing the CPU cache for each DMA read operation. In this case, unnecessary prefetching also wastes cache throughput.

Since various PCI input/output devices use different transfer lengths, it has heretofore not been possible to design a fixed-length prefetch scheme that provides optimal PCI throughput utilization without wasting memory throughput.

SUMMARY OF THE INVENTION

Briefly, the present invention is a memory controller circuit for use with a data processing system in which a direct memory access (DMA) read transaction between a main memory and a peripheral input/output (I/O) device uses a prefetch circuit. The prefetch circuit includes prediction logic that determines an appropriate number of data bytes to be prefetched from the memory based upon a past history of the actual transfer lengths of previous DMA read transactions.

Preferably, DMA transactions use a memory address that includes a page number field associated with various subportions of the memory. The page number is then used as an index into a page table stored in the memory controller. The page table records the amount of data actually transferred when the particular page was most recently accessed. This amount is then read from the page table to determine the amount of data to be prefetched from memory for each subsequent DMA read transaction which accesses that page.

At the end of each DMA read transaction, the actual number of data bytes transferred during the DMA read transaction is recorded again in the page table, so that the table reflects the size of the most recent access to the specified page. During the first DMA read transaction to a particular page, a transfer size is not yet stored in the page table for that page, so a default prefetch size may be used for this first access.

If the page table size is limited, it may be necessary to remove old entries to provide space for new entries. As a result, it may be that a page entry is no longer in the page table even though it has been previously accessed. In this case also, a default prefetch size may be used for the first new access.

The page table may be stored, for example, as part of a scatter-gather map that links I/O device addresses to main memory page addresses.

It is common, although not necessary, for memory buffers for different I/O processes and/or different I/O devices to reside in separate pages in memory. Thus, in most cases separate I/O devices will access separate pages, and therefore separate I/O devices will use separate page table entries to record the size of their transfers. Therefore, the transfer size recorded in a page table entry may also represent the transfer size for a single I/O device or process. Most I/O devices consistently use the same transfer size, so this results in accurate prediction of transfer sizes for most I/O devices.

BRIEF DESCRIPTION OF THE DRAWINGS

The above and further features of the invention include various novel details of construction and combination of components. These novel features will be more particularly pointed out in the following claims, and their advantages will become evident as they are described in detail with reference to the accompanying drawings, in which:

DETAILED DESCRIPTION OF A PREFERRED EMBODIMENT

Figure 1:
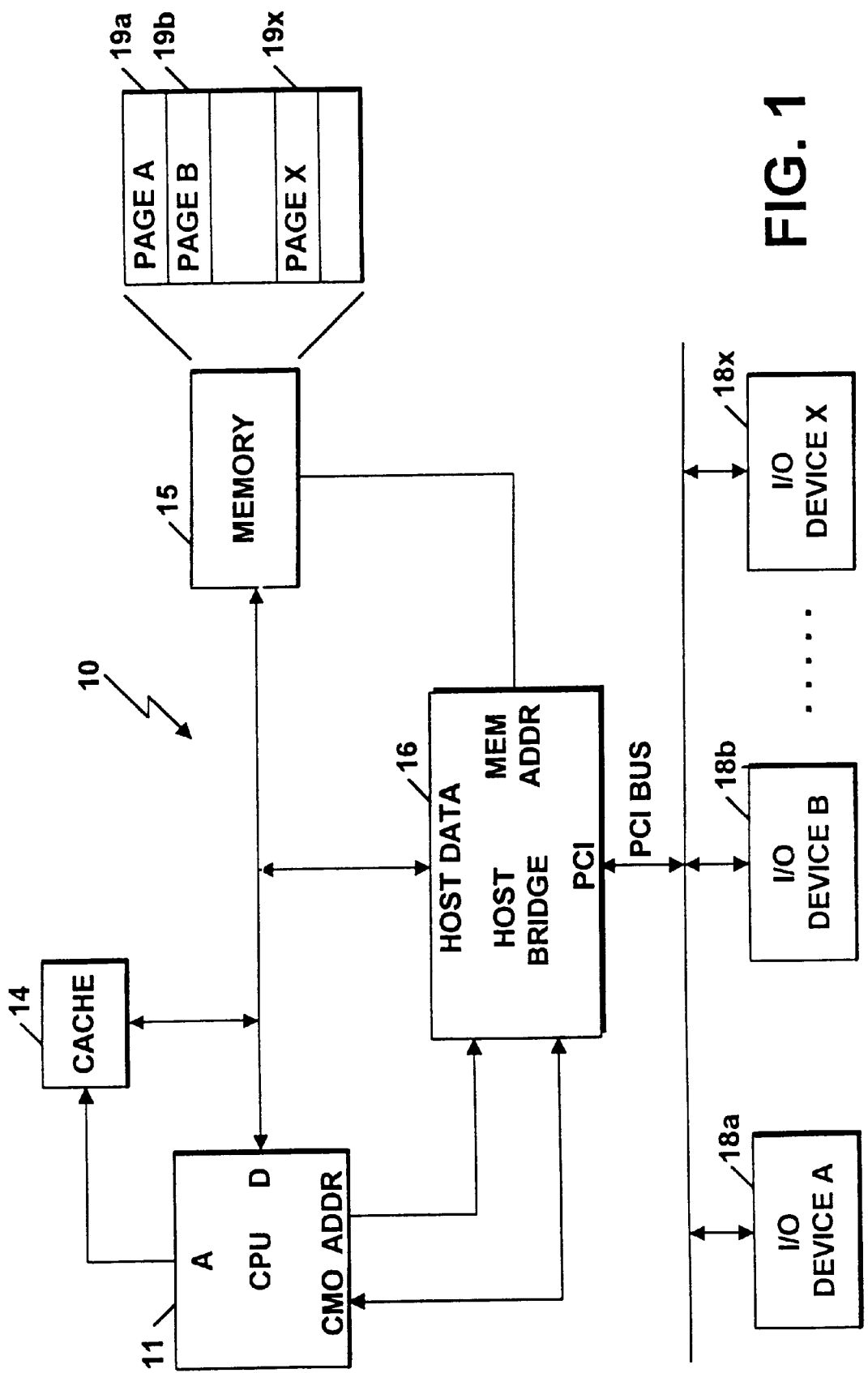
FIG. 1 is a block diagram of a computer system making use of a memory controller according to the invention.

FIG. 1 is a block diagram of a computer system 10 that includes a central processing unit (CPU) 11, a cache memory 14, a main memory 15, a so-called host bridge 16, and a number of peripheral input/output (I/O) devices 18a, 18b, . . . , 18x.

The CPU 11 may be a high speed microprocessor such as the Alpha series microprocessors available from Digital Equipment Corporation of Maynard, Massachusetts. In general, the CPU 11 runs software programs and communicates with peripheral I/O devices 18 connected to a standard external bus such as the Peripheral Component Interconnect (PCI) bus. In the course of running its software, the CPU 11 also makes use of the cache 14 and main memory 15 to read and write data as required. Periodically, the I/O devices 18 issue requests to the host bridge 16 to read data stored in the memory 15, typically via a direct memory access (DMA) transaction that minimizes the need for CPU involvement.

The main memory 15 typically includes dynamic random access memory (DRAM) or synchronous DRAM integrated circuit memory chips. The main memory 15 is organized to permit efficient DMA read access to groups of data bytes at the same time. The group size may be selected in accordance with the so-called cache line size of the cache memory 15 design and if so, that amount of data is typically referred to as a cache line. In the example being discussed herein, a cache line is sixty-four (64) bytes long. The main memory 15 in the illustrated embodiment is arranged to access sixteen (16) bytes in parallel, so that for every four (4) access cycles a cache line is read. A typical memory cycle time is 15 nanoseconds (ns), meaning that a cache line can be transferred every 60 ns.

The main memory 15 is also divided into pages 19-a, 19-b, . . . , 19-x, such that each page 19 contains a number of cache lines. In the illustrated embodiment, the page size is 8192 bytes.

The host bridge 16 contains interface circuits that permit the system 10 to communicate with peripheral devices connected to the PCI bus. Such operations include a direct memory access (DMA) read transaction in which a peripheral device 18 requests data from the memory 15. The DMA read transaction is carried out by DMA logic circuits and data buffers included in the host bridge 16. In a typical DMA read transaction, it takes sixteen (16) thirty (30) nanosecond cycles on the PCI bus to complete a 64 byte transfer or a total of 480 nanoseconds. In addition, in the embodiment being described herein, a DMA memory read transaction typically requires seven more PCI bus cycles to initiate each time a different address is specified.

The access time for reading a cache line from the memory 15 is approximately 180 nanoseconds which is much than the 480 nanoseconds required to move the cache line over the PCI bus to the I/O device 18 that initiated the DMA read. To avoid six or more PCI wait states between cache lines, the host bridge preferably prefetches data from the memory 15 whenever an I/O device 18 initiates a DMA read request and buffers the prefetched data in preparation for transferring it across the PCI bus. It is the selection of the exact number of cache lines to prefetch with each DMA read request that is the subject of the present invention.

More specifically, the present invention uses a prediction logic circuit in the host bridge 16. The predictor logic predicts an optimum number of cache lines to prefetch from the memory 15 based upon the history of past accesses by the I/O devices 18.

Figure 2:
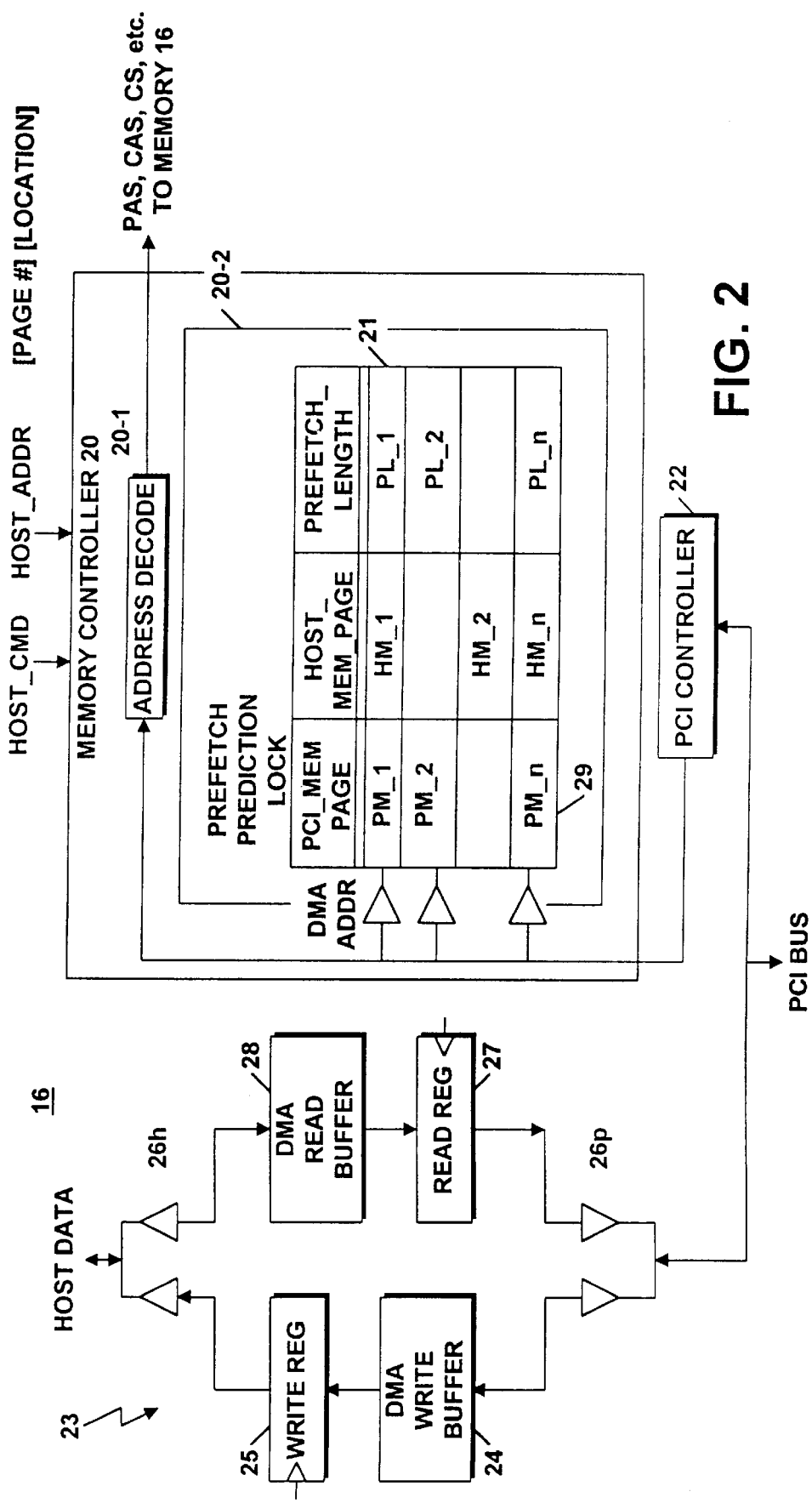
FIG. 2 is a more detailed diagram of the memory controller and prediction logic used therein.

Turning attention now to FIG. 2, there is shown a more detailed diagram of the portions of the host bridge 16 dedicated to supporting a DMA read transaction. As shown in the drawing, the host bridge 16 includes a memory controller 20, a page table memory 21, a PCI bus controller 22, and data bus interface circuit 23 consisting of a DMA write buffer 24, a DMA write register 25, a DMA read register 27, a DMA read buffer 28, PCI data bus driver circuits 26P, and host data bus driver circuits 26H.

The PCI controller 22 controls operations on the PCI bus, cooperating with the bus interface circuits 23 to provide buffering of data during transfers between the host data bus and PCI data bus.

The memory controller 20 consists of an address decode logic circuit 20-1 and the aforementioned prefetch prediction logic circuit 20-2. The address decode logic 20-1 uses the DMA address signals to generate row address strobe (RAS), column address strobe (CAS), write enable (WE), chip select (CS) and other control signals for individual integrated circuits in the memory 15.

The prefetch prediction logic 20-2 uses the DMA address input signals to determine a prefetch length. The prefetch prediction logic 20-2 then initiates a read request to prefetch the exact number of cache lines equal to the prefetch length. The transferred data then travels over the host data bus from the memory 15 to the DMA read buffer 28. If the selected prefetch length is longer than will fit in the DMA read buffer 28, only as many cache lines are fetched as will fit in the buffer 28, and additional cache lines are prefetched when space becomes available in the buffer as a result of previous cache lines being transferred to the PCI bus. When the selected prefetch length has been reached, no additional data is prefetched, even if space is available in the DMA read buffer 28. If all data from the DMA read buffer 28 is transferred to the PCI bus and the DMA master is still requesting data, additional cache lines are then fetched individually as required until the transaction is completed.

A portion of the DMA address is used as a page number to look up an appropriate prefetch length in the page table 21. The page number field is typically composed of or from the most significant bits of the DMA address. The page number serves not only to identify pages 19 of the main memory 15 (such as shown in FIG. 1) but is also used as an index into the table 21.

The table 21 stores prefetch lengths PL_1, PL_2, PL_n for each page 19-1, 19-2, . . . , 19-n as a separate entry. For example, given a host memory page number HM_2, prefetch length data PL_2 is stored in a corresponding location in the page table 21. The table 21 may be stored as part of a larger scatter gather map 29 that also maps PCI bus memory addresses PM to host memory addresses. In the illustrated embodiment, the scatter-gather map 29 is typically implemented as a content-addressable memory. If an access is made to a page that is not yet represented in the scatter-gather map 29, one of the existing entries is discarded and a new entry is made for the new page.

In the illustrated embodiment, the prefetch length PL is set equal to the number of cache lines that were actually read from the respective page 19 of the memory 15 during the most recent time that the page 19 was accessed. This selected entry in the table 21 is updated with the new value at the end of each DMA read transaction. However, the predicted prefetch length PL could also be made to depend upon other functions, such as a weighted average of past cache line counts.

Figure 3:
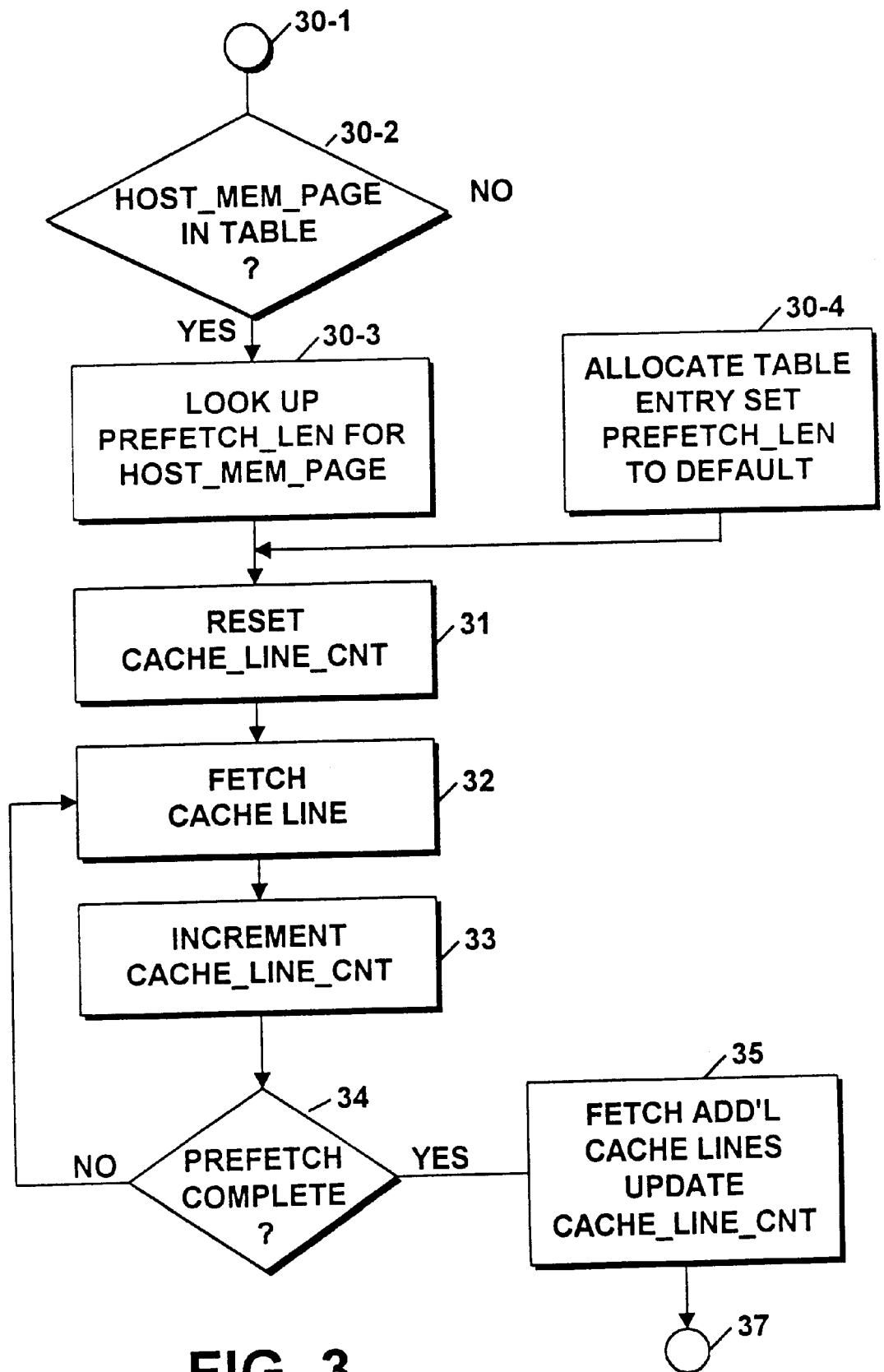
FIG. 3 is a state diagram of various states for the prediction logic.

FIG. 3 is a state diagram showing the operation of the prefetch logic 20-2 more particularly. From an idle state 30-1, an initial state 30-2 is entered upon initiation of a DMA read transfer. If the current host memory page HM is found in the table, a state 30-3 is entered. In this state 30-3, a prefetch length PL is determined for the host memory page HM as indicated by the page field in the memory address portion of the DMA read transaction. If the specified host memory page is not found in the table, state 30-4 is entered, and a default value is loaded into the prefetch length PL.

In a next following state 31, a cache line counter is reset. The cache line counter is used to keep track of the number of cache lines actually transferred during the DMA read transaction.

State 32 is then entered in which a first cache line is fetched from the main memory 15. The cache counter is then incremented in state 33. In state 34, a determination is made if the prefetch operation can be completed. This may occur whenever the number of cache lines indicated in the prefetch length PL have been read, or otherwise upon termination of the DMA read transfer, such as in the event that the DMA master signals the end of the DMA read transaction before the selected number of cache lines have been fetched.

If the prefetch operation is not complete, state 32 is reentered, and additional cache lines are prefetched.

If the prefetch is complete, a state 35 is entered whereby additional cache lines are fetched individually as needed until the DMA master stops requesting data, or the transaction otherwise terminates. During this state 35, the actual cache line count is maintained so that an accurate count of cache lines actually transferred during the DMA read transaction is kept.

Finally, in state 36, the cache line count (or result of other functions as already described) is stored in the page table 21 as the prefetch length PL to be used for the next DMA read transaction. As a result, the page table 21 always reflects an actual DMA read transaction length for the prior access to each page 19.

In the preferable arrangement, there are eight entries in the page table 21. As a result, the host bridge 16 supports up to eight separate DMA read transaction streams efficiently. While there is typically a single DMA read transaction stream for a given I/O device 18, it is also possible that a given I/O device 18 may require more than one DMA read stream. For example, a SCSI type device may actually need two DMA read streams for supporting two separate disk drives although it appears there is physically only one I/O device 18 to the PCI bus.

As a result, a given I/O device, such as a keyboard, may typically require a smaller prefetch length than some other type of I/O device such as a disk drive.

In this manner, the prefetch length PL typically adapts to the observed DMA read transaction lengths on the PCI bus separately for each possible initiator 18 of a DMA read transaction. The result is more efficient accesses to memory, thereby eliminating unnecessary wait states on the PCI bus and/or wasted memory bandwidth which would otherwise result if a fixed length prefetch scheme were used.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the claims.

What is claimed is:

1. A process for providing data from a memory to a peripheral device in a data processing system in response to a direct memory access (DMA) read transaction request, the process comprising the steps of:

(a) determining a memory page number from a starting memory address specified in the DMA read transaction request;

(b) determining a prefetch length value given a memory page number, by accessing a page table that stores a prefetch length value for each of a plurality of pages in the memory;

(c) prefetching data from a number of storage locations in the memory equal to the prefetch length value;

(d) providing data to the peripheral device as retrieved from the memory until the DMA read transaction request terminates;

(e) counting the actual total number of storage locations retrieved during the DMA read transaction; and (f) updating the prefetch length value for the page as a function of the actual number of locations transferred during the DMA read transaction.

2. A process as in claim 1 additionally comprising the steps of:

(g) providing a plurality of storage locations for prefetch length values for each of a plurality of pages in the memory.

3. A process as in claim 2 additionally comprising the step of:

(h) if step (d) of providing data to the peripheral device is terminated before all of the prefetched data from step (c) is provided to the peripheral device in step (d), storing the lesser actual number of locations read by the peripheral device as the prefetch length value.

4. A process as in claim 1 additionally comprising the step of:

(i) assigning a memory page to each of several peripheral devices.

5. A process as in claim 1 additionally comprising the step of:

(j) if the page table does not contain a prefetch length value for the page, prefetching a default number of storage locations.

6. A data processing system comprising:

a central processing unit (CPU) for executing data processing program tasks;

a memory, connected to the CPU, to store and retrieve data to be used by the data processing program tasks, the memory divided into a plurality of memory pages;

at least one peripheral device connected to the data processing system via a peripheral device bus, such that the peripheral device issues direct memory access (DMA) read transaction requests over the peripheral device bus, the DMA read transaction requests specifying a memory address for a DMA read transaction, the memory address including a memory page field;

a memory controller, connected to the peripheral device bus and the memory, such that in response to receiving a DMA read transaction request, the memory controller performs a DMA read transaction by reading data from the memory, causing the data to be provided to the peripheral device over the peripheral device bus; and a prefetch logic circuit, connected to the memory controller, such that, in response to the memory controller receiving a DMA read transaction request, a number of memory locations are prefetched from the memory prior to the data being provided to the peripheral device over the peripheral device bus, the prefetch logic circuit additionally comprising:

a location counter, for counting an actual total number of memory locations read during a DMA read transaction; and a prefetch size register, connected to the counter and the memory controller, for storing the contents of the location counter as a prefetch length value, the prefetch size register also connected to control the number of memory locations prefetched during a DMA read transaction such that during a subsequent DMA read transaction request, the number of memory locations prefetched is equal to the actual total number of memory locations read during a prior DMA read transaction.

7. A system as in claim 6 wherein the prefetch logic circuit is additionally connected to store a prefetch length value at the termination of a read transaction for a plurality of memory pages accessed thereby, and the prefetch length value depending upon a number of memory locations transferred during that read transaction for that particular page.

8. A system as in claim 6 wherein the memory is arranged for read access by cache line locations, and the prefetch length value specifies a number of cache lines.

9. A system as in claim 7 additionally comprising:

a page table, connected to the prefetch logic circuit, the page table including a plurality of table entries, with a table entry for each of a number of pages in the memory, the page table storing a prefetch length value for each associated page indicating the amount of data transferred from the respective page on the last DMA read transaction with that page.

10. A system as in claim 9 wherein a page table entry is made for each of a plurality of data streams from a given peripheral device which initiated the DMA read transaction.

* * * * *